Oct. 31, 1939. J. T. D. SPENCE 2,178,408
ELECTRIC WELDING APPARATUS
Filed Feb. 23, 1938
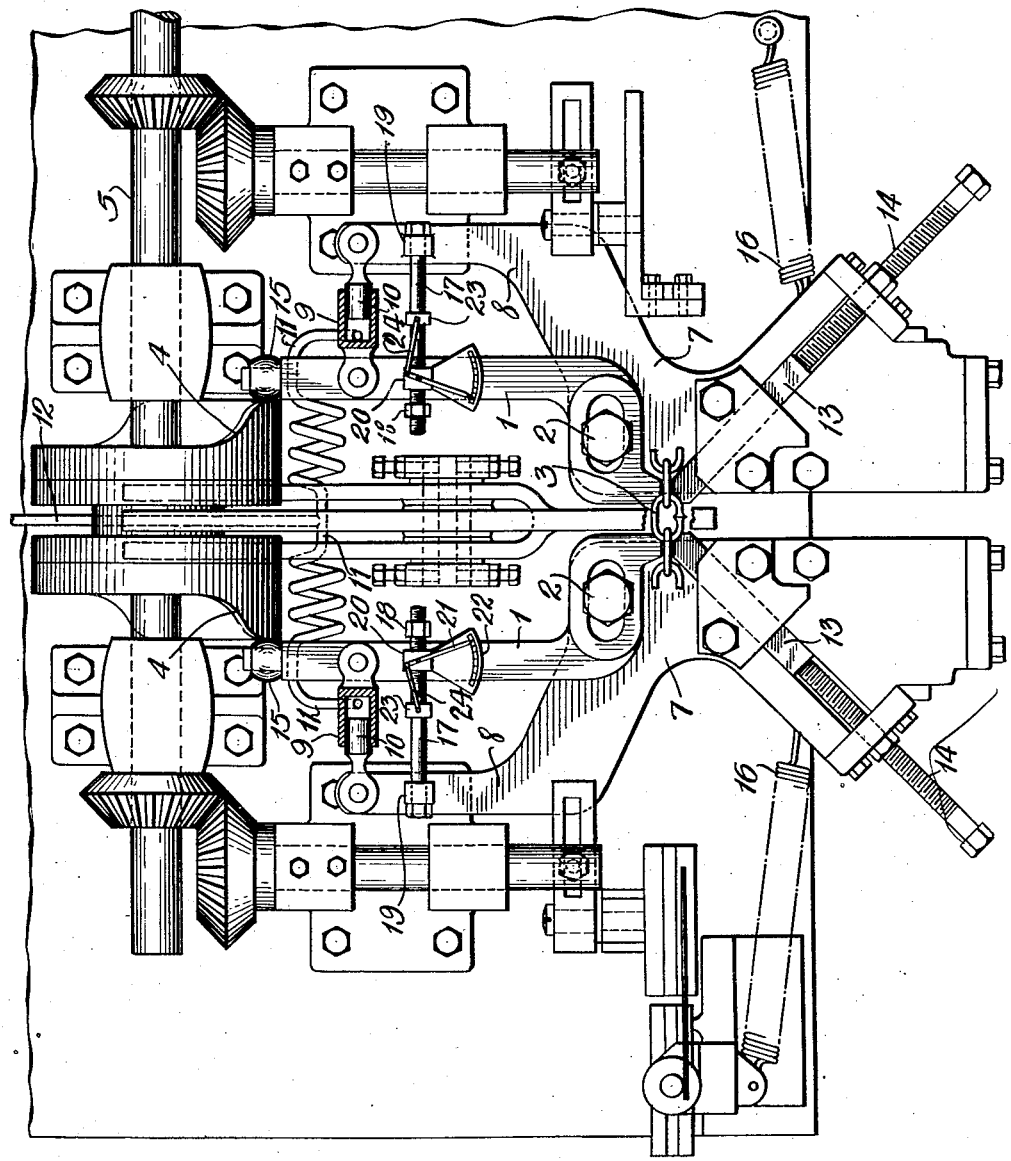
INVENTOR
JOHN T. D. SPENCE
BY
ATTORNEY Patented Oct. 31, 1939

2,178,408

UNITED STATES PATENT OFFICE 2,178,408

ELECTRIC WELDING APPARATUS

John T. D. Spence, Crossway Green, near Stourport-on-Severn, England, assignor to American Chain & Cable Company, Inc., New York, N. Y., a corporation of New York Application February 23, 1938, Serial No. 192,092
In Great Britain February 22, 1937

11 Claims. (Cl. 219—5)

(Granted under the provisions of sec. 14, act of March 2, 1927; 357 O. G. 5)

This invention relates to machines for electrically welding chain links, the chief object being to improve the quality and consistency of the welds and render the operation of such machines more entirely automatic and efficient than has hitherto been the case. The imperfect formation of the links has hitherto been largely responsible for imperfect welding of the joints and furthermore unless a separate operator is placed in charge of each individual machine and is responsible for adjustment of that machine, welds of uniform strength may not always be obtained. The inaccuracies in the formation of the links with which the present invention is primarily concerned is the tendency for some of the links to remain "open", that is to say, the ends of the formed links may not be in proper abutment due to irregularity in forming or by virtue of the inherent resiliency of the metal from which they are formed. In chain welding machines of normal type, whose upsetting levers are actuated entirely by springs, weights or by cam and lever tension, much of the requisite yet limited upset will be lost initially in overcoming this condition with consequent reduction in the true welding upset necessary to effect a satisfactory and homogeneous weld. Furthermore, there is liability for the welds to be strained during cooling as a result of shrinkage of the metal taking place and this is a further difficulty which it is an object of the invention to overcome.

According to the invention in a machine for welding chain links, each of the upsetting levers or equivalent members used for exerting pressure on the links during the welding operation incorporates a hydraulic cylinder and piston or equivalent device for compensating for irregularities in the formation of the links, the flow of the oil or other fluid into and out of the hydraulic cylinders being interrupted either manually or automatically to obtain the ultimate requisite stiffness or rigidity in said levers during the final upsetting operation.

In order that the said invention may be clearly understood and readily carried into effect the same will now be more fully described with reference to the accompanying drawing, which illustrates in plan view a chain welding machine constructed in accordance with the invention.

In the construction illustrated the machine includes two jaw levers 1 each of substantially L shape, the jaw levers being pivotally mounted at opposite ends of the link 3 which is to be welded, the jaws being shaped to engage the opposite ends of the link and being movable into engagement with the link by means of two cams 4 fixedly mounted upon a driving shaft 5 and adapted to be driven through the medium of a clutch. The welding jaws 7 are constructed separately from the jaw levers 1 but are articulated thereto at the points 2 about which the jaw levers pivot, each welding jaw having an integral arm 8 between which arm and its associated jaw lever is interposed a hydraulic cylinder 9 containing a piston 10, each cylinder being connected to its associated jaw lever and each piston being connected to its associated arm. The two cylinders are interconnected by means of the pipe 11 the cylinders being supplied with oil or other fluid by means of a supply pipe 12, the flow of oil or other fluid into and from the cylinders being interrupted by means of a suitable valve (not shown) which may be associated with the supply pipe 12 and which is actuated either manually or through the medium of a cam or other device actuated automatically by the mechanism of the welding machine at the appropriate moment.

Each welding jaw 7 incorporates a copper or other electrode 13 which engages the link, the position of each electrode being manually adjustable by means of its associated adjusting screw 14 to compensate for wear. As distinct from those chain welding machines of normal type employing separate electrodes and upsetting members, the machine described embodies dual purpose electrodes whose function is to upset the links also.

Each of the jaw levers 1 carries at its extremity a cam roller 15 which is maintained in engagement with the surface of the cam by means of a spring 16, each spring being anchored to the bed plate or other fixed part of the machine and connected at its opposite end to the welding jaw, each spring acting on its associated jaw lever through the medium of the welding jaw and the hydraulic coupling. Each of the jaw levers 1 and its associated arm 8 are connected together by means of a bolt 17 and nut 18, the latter constituting an adjustable stop for limiting separating movement of the jaw levers and arms 8, each bolt passing through lugs 19 and 20 on the arms 8 and jaw levers 1 respectively. The arrangement is such that although the nut limits separating movement of the parts it nevertheless allows of free inward movement of the parts towards each other when the pressure in the hydraulic cylinders is relaxed.

The pressure of the oil or other fluid in the hydraulic cylinders serves to connect each jaw lever 1 with its associated arm 8 of the welding jaw 7 and the adjustment of the stops 18 is such that when the jaws are initially closed upon any pre-welded link the distance between the electrodes would (in the absence of the link) be less than is actually required to embrace the link. Accordingly the main welding jaws upon closing would virtually open to the extent of this difference and any consequent resistance will be opposed only in the hydraulic coupling.

The hydraulic cylinders are preferably so arranged that the pressure of the oil or other fluid supplied thereto may be varied to suit the overall dimensions, diameter and material comprising the link being acted upon, the pressure being adjusted so that it is sufficient to close "open" links whose ends are not in proper abutment due to irregularity in their formation. It is desirable to maintain this pressure initially or through the preliminary warming up stages. Subsequently, however, and before welding temperature is reached the supply of oil or other pressure producing fluid is interrupted automatically by means of the aforementioned cam or alternatively by means of a solenoid, electro-magnet, or other mechanism (not shown), or by hand, the further initial squeeze or upset being derived solely through the resilience of the jaws or levers such as is obtained at the present time. Until the valve is again opened to the supply of oil or other fluid the hydraulic coupling will virtually remain solid and the final "shove" derived positively as a result of the high lift parts of the cam or cams engaging the rollers on the jaw levers.

The present method of putting on "shove" can no longer apply as the machine is intended to operate satisfactorily regardless of electrode adjustment within limits. Whilst any final upset will remain constant there are two possible alternative ways of varying the total upset or for maintaining the correct mean welded link dimensions in any chain.

In the first case, the initial hydraulic pressure can be raised to increase the amount of collapse prior to interruption of the supply of oil or other pressure producing fluid. In the alternative method any initial hydraulic pressure can be maintained over a desired or longer period prior to interruption. Both effect the same condition, while in each case the control valve may be conveniently actuated from the clutch shaft, and through an interchangeable cam mechanism, or alternatively by means of a solenoid or electro-magnet.

The machine constructed in accordance with the invention is suitable for use in welding higher Brinell links. Here, re-opening the control valve subsequent to final upset yet prior to re-cycling the machine effectively compensates for any link contraction during cooling.

It is preferred that each hydraulic cylinder shall incorporate or have associated with it an indicating device which will give to the operator a visual indication of the necessity for adjustment of the electrodes to compensate for wear. The indicating device illustrated includes a pointer 21 cooperating with a graduated scale 22, the pointer being pivotally mounted upon the lug 20, the latter also serving as a support for the scale. The pointer is connected with a collar 23 fixed to the bolt 17, by means of a link 24, whereby movement of the jaw lever 1 towards or away from the arm 8 will be communicated to the pointer. A similar indicator is associated with the remaining jaw lever and arm and by periodically glancing at the indicators the operators can tell as a glance whether or not electrode adjustment is necessary. In this way a single operator may readily take charge of a number of machines as he is able to ascertain quickly and with certainty if and when adjustment is necessary.

While I have described a preferred embodiment of my invention, it is to be understood that this is to be taken as illustrative and not limitative, and that I reserve the right to make various changes in form, construction and arrangement of parts without departing from the spirit and scope of my invention as set forth in the following claims.

I claim:

1. In a machine for electrically welding chain links, the combination of pairs of movably mounted members for engaging opposite ends of a link for closing the gap in the link and for upsetting the link during the welding operation, a hydraulic connection between the members of each pair, and positive means for operating one member of each pair of members for effecting said operations.

2. In a machine for electrically welding chain links, the combination of a plurality of pairs of levers for closing the gaps in links and for upsetting the links during the welding operation, a hydraulic connection between the levers of each pair of levers, and a cam for operating one lever of each pair of levers.

3. In a machine for electrically welding chain links, the combination of a plurality of pairs of movable members one member of each pair being adapted to engage a link to close the gap therein and to upset the link during the welding operation, a hydraulic connection between the members of each pair, and positive means for operating the other members of said pairs.

4. In a machine for electrically welding chain links, the combination of means for closing the gap in a link and for upsetting said link during the welding operation, a cam, a member operated directly by said cam and pivoted to said means, and a hydraulic connection between said member and means to compensate for irregularities in the formation of the links.

5. In a machine for electrically welding chain links, the combination of means for closing the gaps in links and for upsetting the links during the welding operation, a cam, a member operated directly by said cam and pivoted to said means, and a hydraulic connection between said member and said means operating during the closing of the gaps to compensate for irregularities in the formation of the links and operating during the upsetting operation to cause said means and member to operate as a unitary structure.

6. In a machine for electrically welding chain links, the combination of means for closing the gap in a link and for upsetting said link during the welding operation, a cam, a member operated directly by said cam and pivoted to said means, and a hydraulic connection between said member and means operating to compensate for irregularities in the formation of the links, to cause said cam to transmit movement of said member positively to said means during the upsetting operation, and to cause said means to follow the contraction of the link during the cooling period.

7. In a machine of the class described, the combination of a pivoted welding jaw, a lever pivotally connected to said welding jaw, and a hydraulic cylinder and piston connection between said lever and welding jaw.

8. In a machine of the class described, the combination of a pair of movably mounted members, an electrode adjustably mounted on one of said members, a dial mounted on one of said members, and a pointer movable with the other of said members for visually indicating the necessity for electrode adjustment.

9. In a machine for electrically welding chain links, the combination of a movable link engaging member for closing the gap in a link and for upsetting the ends of the link during the welding operation, actuating means, a second movable member operated by said actuating means, and a hydraulic connection between said members operating during the closing of the gap in the link to move said first mentioned member variable distances to compensate for irregularities in the formation of links and operating during the upsetting operation to move said second mentioned member constant distances to effect uniform upsetting.

10. In a machine for electrically welding chain links, the combination of a pair of movable members one of said members being adapted to engage said link to close its gap and effect upsetting of the ends of the link during the welding operation, positive means for actuating the other of said members, and a hydraulically expansible and contractible member for transmitting movement from said second mentioned member to said first mentioned member.

11. In a machine for electrically welding chain links the combination of a pair of movable members one of said members being adapted to engage said link to close its gap and effect upsetting of its ends during the welding operation, positive means for actuating the other of said members, and a hydraulic pressure-controlled member for transmitting movement from said second mentioned member to said first mentioned member.

JOHN T. D. SPENCE.